(12) United States Patent
Beachem et al.

(10) Patent No.: US 8,387,131 B2
(45) Date of Patent: Feb. 26, 2013

(54) ENFORCING SECURE INTERNET CONNECTIONS FOR A MOBILE ENDPOINT COMPUTING DEVICE

(75) Inventors: Brent R. Beachem, Riverton, UT (US); Steven S. McLain, Provo, UT (US); Richard B. Rollins, Riverton, UT (US); Neil R. Shaw, Salt Lake City, UT (US)

(73) Assignee: Novell, Inc., Provo, UT (US)

( * ) Notice: Subject to any disclaimer, the term of this patent is extended or adjusted under 35 U.S.C. 154(b) by 446 days.

(21) Appl. No.: 12/467,553

(22) Filed: May 18, 2009

(65) Prior Publication Data

US 2010/0293610 A1 Nov. 18, 2010

(51) Int. Cl.
*G06F 17/00* (2006.01)
(52) U.S. Cl. ........................................................ 726/15
(58) Field of Classification Search .................... 726/15
See application file for complete search history.

(56) References Cited

U.S. PATENT DOCUMENTS

| | | | |
|---|---|---|---|
| 6,327,660 B1 | 12/2001 | Patel | |
| 6,754,188 B1 | 6/2004 | Garahi et al. | |
| 6,996,706 B1 | 2/2006 | Madden et al. | |
| 7,082,117 B2 | 7/2006 | Billhartz | |
| 7,165,170 B2 | 1/2007 | Rothman et al. | |
| 7,206,931 B2 | 4/2007 | Zimmer et al. | |
| 7,237,102 B2 | 6/2007 | Rothman | |
| 7,243,224 B2 | 7/2007 | Nair et al. | |
| 7,257,704 B2 | 8/2007 | O'Neal | |
| 7,308,703 B2 | 12/2007 | Wright et al. | |
| 7,320,052 B2 | 1/2008 | Zimmer et al. | |
| 7,346,167 B2 | 3/2008 | Billhartz et al. | |
| 7,353,533 B2 | 4/2008 | Wright et al. | |
| 7,412,595 B2 | 8/2008 | Velhal et al. | |
| 7,426,179 B1 | 9/2008 | Harshavardhana et al. | |
| 7,448,030 B2 | 11/2008 | Lin et al. | |
| 7,460,489 B2 | 12/2008 | Sugiarto et al. | |
| 7,478,420 B2 | 1/2009 | Wright et al. | |
| 7,978,691 B1* | 7/2011 | Cole | 370/386 |
| 2002/0072391 A1 | 6/2002 | Itoh | |
| 2003/0041136 A1* | 2/2003 | Cheline et al. | 709/223 |
| 2005/0166213 A1 | 7/2005 | Cromer et al. | |
| 2006/0094400 A1* | 5/2006 | Beachem et al. | 455/410 |
| 2007/0107043 A1 | 5/2007 | Newstadt | |
| 2007/0192867 A1* | 8/2007 | Miliefsky | 726/25 |
| 2007/0198819 A1 | 8/2007 | Dickens et al. | |

(Continued)

OTHER PUBLICATIONS http://en.wikipedia.org/wiki/Wimax; "WiMax"; Page last modified on Feb. 3, 2009; 18 pages.

(Continued)

*Primary Examiner* — Cordelia Zecher
(74) *Attorney, Agent, or Firm* — King & Schickli, PLLC

(57) ABSTRACT

Methods and apparatus enforce a secure internet connection from a mobiles endpoint computing device. A security policy for the endpoint is defined based on its location. From that location, an internet connection is established and detected. This event triggers the launching of a full VPN tunnel connection including an NDIS firewall forcing packet traffic through a port of the endpoint computing device assigned by the security policy and/or MAC/IP addresses of a VPN concentrator. Thereafter, the packet traffic is monitored for compliance with the security policy. This includes determining whether packet traffic over the assigned port is observed within a given time or packet traffic is attempted over other ports. Monitoring occurs whether or not the protocol of the VPN tunnel connection is known. Other features contemplate quarantining for improper operation of the VPN tunnel, undertaking remediation, and computer program products, to name a few.

23 Claims, 7 Drawing Sheets

U.S. PATENT DOCUMENTS

| | | | |
|---|---|---|---|
| 2007/0266120 | A1 | 11/2007 | Tallieu et al. |
| 2007/0294520 | A1 | 12/2007 | Leigh et al. |
| 2008/0034416 | A1 | 2/2008 | Kumar et al. |
| 2008/0043760 | A1 | 2/2008 | Venkatraman et al. |
| 2008/0095067 | A1 | 4/2008 | Rao |
| 2008/0144590 | A1 | 6/2008 | Rantanen et al. |
| 2008/0147830 | A1 | 6/2008 | Ridgill et al. |
| 2008/0212503 | A1 | 9/2008 | Lipford et al. |
| 2008/0291841 | A1 | 11/2008 | Joung et al. |
| 2009/0037763 | A1 | 2/2009 | Adhya et al. |
| 2009/0043891 | A1 | 2/2009 | Woo et al. |
| 2010/0058442 | A1 | 3/2010 | Costa |
| 2010/0153696 | A1 | 6/2010 | Beachem et al. |
| 2010/0235514 | A1 | 9/2010 | Beachem |

OTHER PUBLICATIONS http://en.wikipedia.org/wiki/Mesh_networking; "Mesh networking"; Page last modified on Feb. 1, 2009; 4 Pages.

http://www.novell.com/products/zenworks/endpointsecuritymanagement/: "Novell ZENworks Endpoint Security Management"; Printed on Feb. 3, 2009; 1 Page.

http://www.novell.com/products/zenworks/endpointsecuritymanagement/productinfo; "Novell ZENworks Endpoint Security Management"; Printed on Feb. 3, 2009; 1 Page.

http://www.novell.com/rc/docrepository/public/37/baseddocument.2007-08-10.2324835973/4622065_en.pdf, "Novell ZENworks Endpoint Security Management; Total Control from a Single Console", Printed on Feb. 3, 2009; 11 Pages.

http://www.novell.com/rc/docrepository/public/25/baseddocument.2008-03-13.5186701808/securing_the_corporate_desktop_presentation_en.pdf, "Novell Endpoint Security Management"; Printed on Feb. 3, 2009; 32 Pages.

http://www.novell.com/rc/docrepository/public/16/baseddocument.2008-03-12.2205304456/4641033_en.pdf, "Novell ZENworks Endpoint Security Management"; Printed on Feb. 3, 2009; 27 Pages.

Preeboot Execution Environment (PXE) Specification, Version 2.1, Sep. 20, 1999, Intel Corporation, 103 Pages.

Intel vPro Technology for Notebook and Desktop PCs, (undated), Intel Corporation, http://www.intel.com/technology/vpro/index.htm, 2 pages, printed Nov. 20, 2008.

Preboot Execution Environment, Updated Aug. 14, 2008, Wikipedia, http://en.wikipedia.org/wiki/Preboot_Execution_Environment, 5 pages.

http://computer.howstuffworks.com/vpn10.htm; "How Virtual Private Networks Work"; Jeff Tyson; Printed May 5, 2009; 5 Pages.

http://en.wikipedia.org/wiki/VPN: "Virtual private network"; Page last modified on Apr. 22, 2009; 8 Pages.

http://www.nacs.uci.edu/security/vpn/vpninfo.html#why; "VPN Information"; Updated: Feb. 4, 2008; 2 Pages.

http://www.lacisd.org/app/webroot/files/14_techdayatt1_Zenworks%20overview%2012-08-08.pdf; "Novell® ZENworks® Enterprise Systems Management"; 201 Novell, Inc,; 45 Pages.

download.microsoft.com/download/e/7/6/e76fdda3-5c2c-4fbb-9c6f-3bcd0ed4b8ef/Firewall_Corewp.doc "Microsoft Internet Security & Acceleration Server 2006, ISA Server 2006 Firewall Core"; Jun. 2006; 23 Pages.

U.S. Appl. No. 12/381,624 Office Action dated Oct. 7, 2011.

U.S. Appl. No. 12/316,466 Office Action dated Oct. 17, 2011.

* cited by examiner

ENFORCING SECURE INTERNET CONNECTIONS FOR A MOBILE ENDPOINT COMPUTING DEVICE

FIELD OF THE INVENTION

Generally, the present invention relates to computing devices and computing environments involving endpoint assets, such as laptops, PDAs, phones, etc. for an enterprise or other entity. Particularly, although not exclusively, it relates to enforcing internet connections on the endpoint in a secure manner to comply with policies. The invention also relates to the field of computing tasks in a mobile computing environment as endpoint assets move between locations during use. Other features contemplate computing arrangements, quarantining non-complying endpoints, problem remediation, and computer program products, to name a few.

BACKGROUND OF THE INVENTION

Corporate computing assets, such as laptops, phones, PDAs, etc. are utilized outside corporate firewalls more than ever before. With increasing numbers of employees either working from home or "on the road," controlling and managing corporate information technology (IT) assets is becoming a difficult or serious problem. Also, as networks become ubiquitous, computing assets are able to connect in a variety of ways as they move about during use, including traditionally insecure locations like public "hotspots," hotels, etc. While corporations may have "paper policies" indicating employees must use security products (e.g., VPN tunnels) when making network connections in these insecure and/or public locations, they have no practical means to actually enforce them. (For example, existing tools are known to launch a VPN connection, but none are known to enforce and confirm its correct use.)

In turn, corporate assets violating policy risk security not only to the hardware and data files of the asset, but also to the entire corporate enterprise when infected devices are brought behind and used inside the corporate firewall. With the advent of virtual computing devices, problems are further exacerbated since a single hardware platform will often guest many virtual computing devices, each with potentially vastly different operating systems, drivers, interfaces, etc., and their own ability to make network connections.

Accordingly, a need exists in the art of endpoint computing assets for better enforcement of policies in network environments. Also, such need should extend to virtual environments, each with many domains per a single hardware platform, and to mobile environments as assets move about during use. Naturally, any improvements along such lines should further contemplate good engineering practices, such as simplicity, ease of implementation, unobtrusiveness, etc.

SUMMARY OF THE INVENTION

The foregoing and other problems become solved by applying the principles and teachings associated with the hereinafter described disclosure. Broadly, the invention enforces a secure internet connection from a mobile, endpoint computing device, but additionally identifies if the connection has been correctly established and used correctly and then monitored for ongoing proper connectivity. In this manner, the "paper policies" of enterprises may be truly enforced when users of enterprise devices connect to the Internet in various public or otherwise insecure locations (e.g., hotspots, hotels, etc.).

Methods and apparatus include a security policy for the endpoint device as a function of its location. From that location, an internet connection is established and detected. This event triggers the launching of a full VPN tunnel connection including an NDIS firewall forcing packet traffic through a port of the endpoint computing device assigned by the security policy and/or MAC/IP addresses of a VPN concentrator. Thereafter, the packet traffic is monitored for compliance with the security policy, such as determining whether packet traffic over the assigned port is observed within a given time or whether packet traffic is attempted over ports other than the assigned port. Monitoring can occur whether or not the protocol of the VPN tunnel connection is known. Other features contemplate quarantining the computing device if the proper operation of the VPN tunnel connection cannot be confirmed, undertaking rededication to fix problems, and computer program products, to name a few.

The policies may be resident with the endpoint or pushed from an enterprise device, such as a host server, or exist on both, or elsewhere. Also, the policies can be evaluated for currentness and updated occur over time. In certain other embodiments, the policies can control connectivity components in the endpoint, such as network cards, modems, adapters, etc.; specify brands of components for connection according to inherent security features therein; specify third party carrier companies and their security features which enable the computing connection; or the like. During use, the security policies are enforced on the endpoint.

In certain hardware embodiments, a platform of the computing device includes a processor(s), memory (RAM, ROM, etc.) and available remote or local storage. A policy control module configured on or with the operating system exists to enforce the security policy regarding computing connections. Also, the hardware platform can be configured to carry multiple computing domains in a virtual environment by way of a hypervisor or other managing layer for scheduling control of various domains on the assets of the physical environment. As such, each domain or select domains can also have a policy control module for undertaking the foregoing. Similarly, the module can be shared commonly. The device also has at least one port for conducting the internet connection and a location detection module to determine a location thereof. A VPN module launches tunnel connections, whereby an NDIS firewall can force packet traffic of the internet connection through one of the ports assigned by the security policy, through the security module, and/or MAC/IP addresses of a VPN concentrator. A security agent monitors the packet traffic at the assigned port for compliance with the security policy. Altogether when a VPN connection is required during use, means are provided to enforce proper configuration of the VPN tunnel, validating that it is running correctly or the security risks are removed by not allowing any network connections to the Internet if a policy requires a VPN full tunnel, and means of automatic remediation if the connection is not established, severed, or timed out.

Executable instructions loaded on one or more computing devices for undertaking the foregoing are also contemplated as are computer program products available as a download or on a computer readable medium. The computer program products are also available for installation on a network appliance or individual computing devices. Retrofitting of existing computer products, such as Novell's ZENworks Endpoint Security Management (ZESM), will serve to minimize costs of implementation.

These and other embodiments of the present invention will be set forth in the description which follows, and in part will become apparent to those of ordinary skill in the art by reference to the following description of the invention and referenced drawings or by practice of the invention. The claims, however, indicate the particularities of the invention.

BRIEF DESCRIPTION OF THE DRAWINGS

The accompanying drawings incorporated in and forming a part of the specification, illustrate several aspects of the present invention, and together with the description serve to explain the principles of the invention. In the drawings.

DETAILED DESCRIPTION OF THE ILLUSTRATED EMBODIMENTS

In the following detailed description of the illustrated embodiments, reference is made to the accompanying drawings that form a part hereof, and in which is shown by way of illustration, specific embodiments in which the invention may be practiced. These embodiments are described in sufficient detail to enable those skilled in the art to practice the invention and like numerals represent like details in the various figures. Also, it is to be understood that other embodiments may be utilized and that process, mechanical, electrical, arrangement, software and/or other changes may be made without departing from the scope of the present invention. In accordance with the present invention, methods and apparatus are hereinafter described for enforcing secure internet connections by endpoint computing devices.

Figure 1:
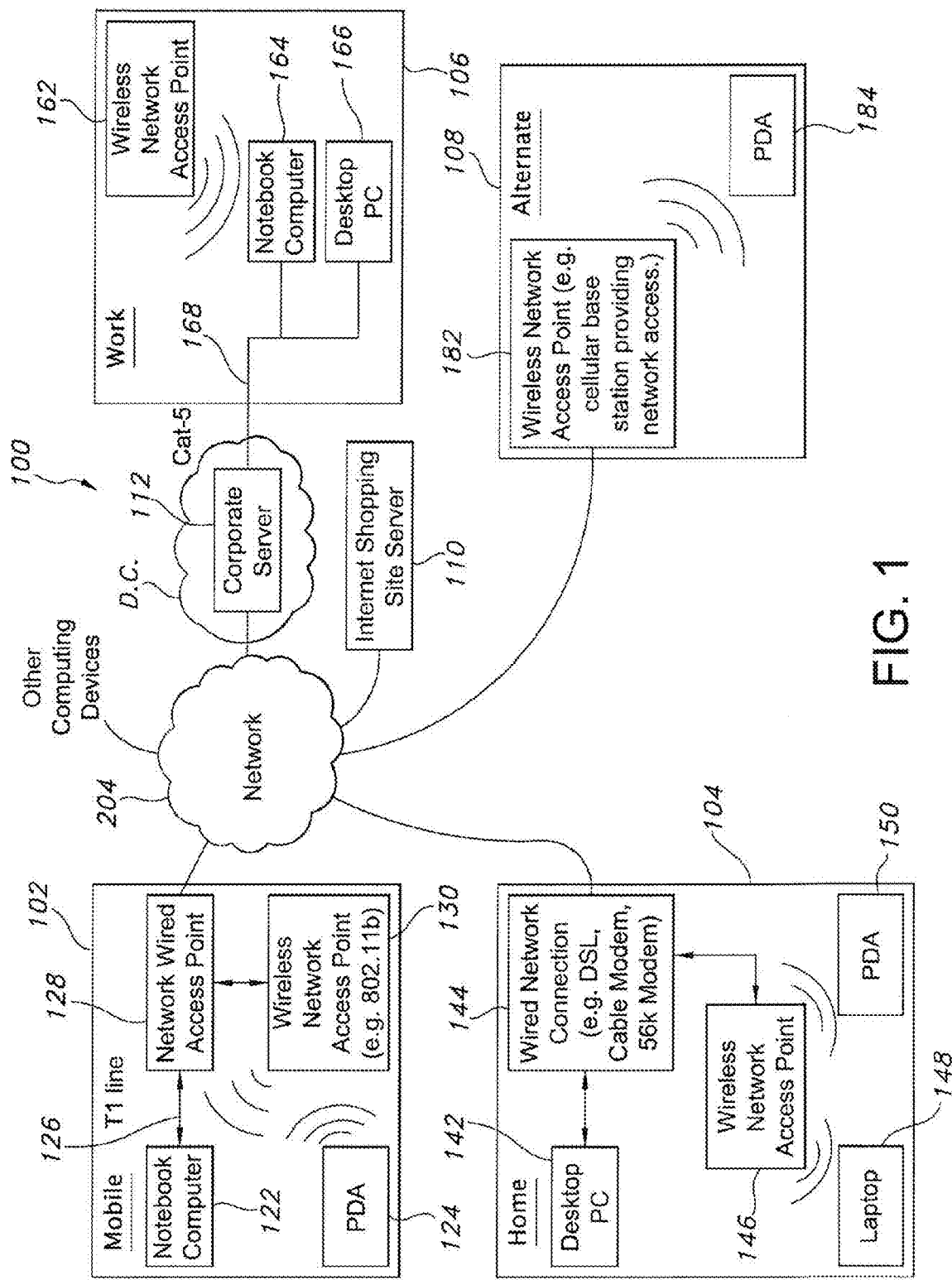
FIG. 1 is a diagrammatic view in accordance with the present invention of a representative computing environment in which an endpoint computing device may operate.

With reference to FIG. 1, a representative computing environment in which an endpoint asset or computing device will operate is given generally as 100. In category, one or more locations 102, 104, 106, 108 are available in which the endpoint may operate in the environment. Also, the asset represents a range of electronic systems (either wired or wireless) including, for example, general or special computers, desktops or laptops, phones, personal digital assistants (PDAs), audio players, or any other electronic device sophisticated enough to generally communicate with other electronic devices.

In a first location category, "Home" 104 is an example of a user's house, apartment, etc. whereby user's fairly often conduct work with an asset of their employer. In this category, each of endpoint computing devices 148 and 150 communicate wirelessly via a wireless network access point (NAP) 146, in turn connected to a larger network at 144. Alternatively, an endpoint computing device in the form of a desktop 142 communicates via a network connection at 144 that is directly wired.

In a second category, the location "Work" 106 is an example of a network environment maintained by a user's employer, such as a corporation or other enterprise. In the illustration, endpoints in the form of notebook and desktop computers 164, 166 have a wired CAT-5 Ethernet connection 168 to a corporate server 112, in turn, connected to other networks such as the Internet. Alternatively, the notebook computer 164 may also communicate with the server 112 through a wireless NAP 162 as illustrated. In either, skilled artisans generally associate these devices with being behind an enterprise firewall, and other appliances will likely exist as part of a larger data center (DC) environment.

In a third category, the location "Mobile" 102 represents environments such as those found at airports, hotels, "hotspots," restaurants, or the like, or even trains, airplanes, cruise ships, cars, etc. As such, an endpoint device, such as the illustrated notebook computer 122, might access a wired NAP 128 through a Tx line 126 and gain access to an Internet shopping site server 110 because the user desires to browse the site while awaiting an airline departure. On the other hand, the notebook computer 122 and PDA 124 might wirelessly connect to a wireless NAP 130, in this example an 802.11b connection, through which they communicate at the airport, for instance.

In a last category, an "Alternate" location is given as 108. In this environment, it is contemplated that a dedicated infrastructure might exist such as a university campus, in which the endpoint is operating, but otherwise has no affiliation. Similarly, a "Custom" or another named location may be defined by users. As seen, the wireless NAP 182 in this location is associated with a cellular base station providing network access through a General Packet Radio Services (GPRS) system, Global System for Mobile communication (GSM) system, third generation wireless 3G system or other kind of mobile wireless communication system.

Additionally, as discussed below, each location may have a predetermined computing policy that defines how and to what extent an endpoint computing asset may operate, such as by communicating with other computing devices and transferring data, surfing the Internet, undertaking downloads, patching applications, etc. In turn, the policy may vary from location to location. Optionally, it is even relevant that the computing policy take into account the actual connection type of the endpoint asset, such as wired or wireless, and/or the specifics thereof, e.g., T1 line, 802.11, VPN, firewall setting, etc. Of course, a "default" policy could be further introduced that sets a minimum or maximum threshold of security, for example, or that exists in situations when the actual location of the endpoint device cannot be ascertained or guaranteed to a policy's satisfaction, or for any other reason.

Figure 2A:
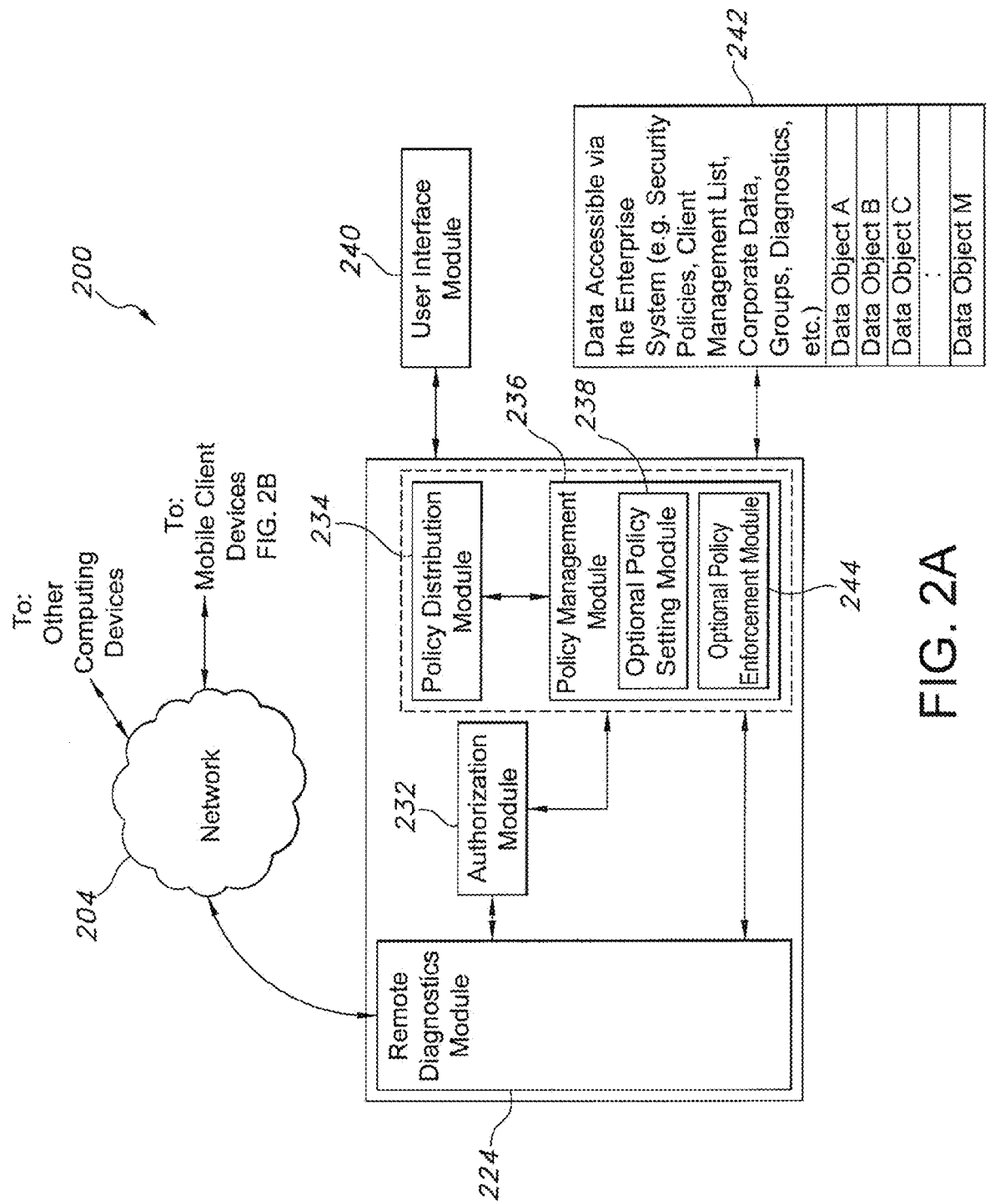
FIGS. 2A and 2B are diagrammatic views in accordance with the present invention of opposite ends of an environment, including enterprise host and client.
Figure 2B:
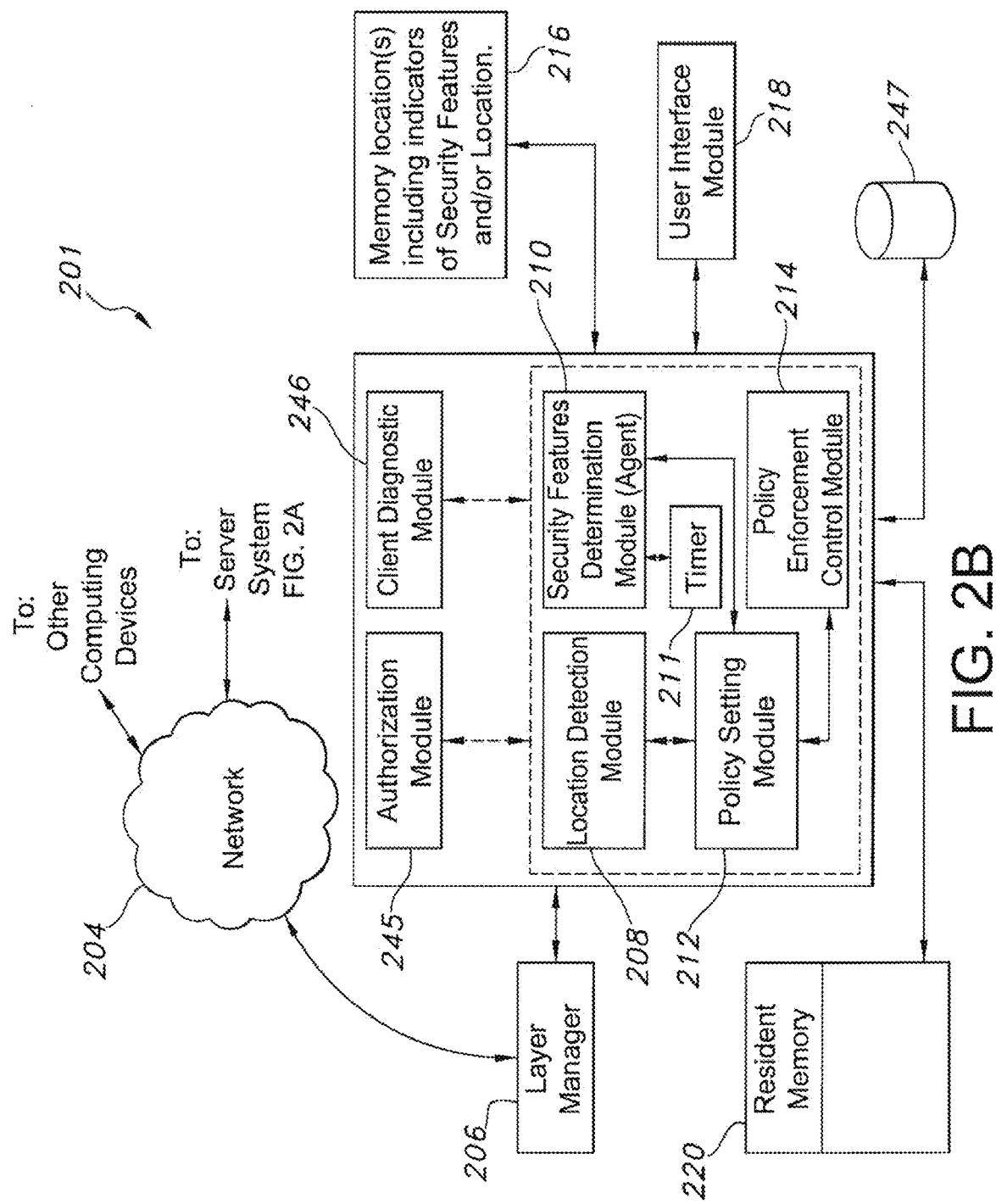

With reference to FIGS. 2A and 2B, a representative illustration of the computing environment of FIG. 1 is seen when a computer system 200 (FIG. 2A) acts in a host, server role with respect to an endpoint asset in the form of a mobile, laptop 201 (FIG. 2B) acting in a client role. Similarly, FIGS. 2A and 2B also illustrate interaction between the server computer system 200 and the client 201 for the purpose of establishing/maintaining security policies, in one embodiment.

In this regard, the system 200 may be implemented as software executing in a standalone computer having a processor being accessible to memory, the processor being communicatively coupled with one or more network interfaces, a display and input/output devices such as a keyboard and a pointing device. Similarly, the system 200 may be implemented by a series of networked computers as may be typically implemented by an enterprise. Additionally, the system 200 in FIG. 2A may also be implemented in another mobile computing device. As is typical, the server or server-side system 200 allows an administrator to manage and distribute policies and software upgrades, analyze logs, and perform remote diagnostics. Similarly, the client system 201 in FIG. 2B may be implemented as software executing in a mobile computing device having a processor being accessible to memory, the processor being communicatively coupled with one or more network interfaces, a display and input/output devices such as a keyboard and a pointing device. The client side system 201 also monitors the user's changes in location and/or security features and applies the appropriate policies automatically as the user moves about or as different security features are activated or deactivated. The client 201 enforces the policies set up by the administrator, and performs diagnostics. The client 201 can also create and manage policies for the client mobile device when run in a self-managed mode.

In more detail, FIG. 2A illustrates a system 200 having an authorization module 232, a policy distribution module 234, a policy management module 236, illustrated here with an optional policy setting module 238 and an optional policy enforcement module 244, a remote diagnostics module 224 and a user interface module 240.

The policy management module 236 manages security policies. One aspect of managing security policies is defining the policies. In this example, the policy management module 236 comprises instructions for establishing a pre-defined criteria based upon user input processed by the communicatively coupled user interface module 240. Defining policies includes the creation of policies and the modification of policies. Examples of aspects of a policy includes specification of rules and permissions (e.g. policy override), defining one or more locations associated with network environments, defining or identifying security features to be monitored, ports to be monitored, network services to be monitored, applications to be monitored, enforcement mechanisms to be put in place for a particular policy, level identification for a policy or policy aspect for flexibility (optional, recommended, mandatory, invisible), and feedback (e.g. custom error messages) to alert an administrator via a user interface screen using the server system 200 of certain conditions or to alert a client device user via a user interface screen of certain conditions.

There may be several layers of policies. For instance, there may be a base policy applicable to a group of entities. Examples of entities may be users or the mobile devices themselves. In these examples, the group may include one instance of an entity. The attributes of the base policy may be incorporated into other policies which add on additional attributes. For example, a base policy for a group including engineers in a user interface design department may allow access to files on a certain disk drive. Another policy based on location that incorporates the attributes of the base policy may, on the other hand, only allow access to encrypted versions of files if a mobile device through which a UI design engineer is logged in is operating in a "Home" network location. Of course, other examples are readily imagined by skilled artisans.

In other embodiments, the policy management module 236 is provided with an enterprise's existing group structures and the policy management module compensates for a failing in the traditional makeup of groups. That is, since groups are not always hierarchical, it is common for one person to be a member of several groups. To the extent each group has its own security policy, an issue can arise as to how to determine which policy to apply to a particular user. Thus, the policy management module 236 inputs a prioritized list of groups from a memory location 242. The policy management module then searches the groups in priority order of the list. In the event a person is a member of "engineering" and "executive staff," that person will get the security policy for whichever of those two groups comes first in the prioritized list. Alternatively, in the event a user is not a member of any group, there is provided a default policy on the prioritized list.

Connected to the policy management module is the policy distribution module 234. Its function is to distribute security information to the one or more client mobile devices 201. Examples of security information are versions of existing policies, updated policies, software, or the like.

Connected to the policy management module is the authorization module 232. It functions to authorize a communication exchange between the client mobile device and the policy distribution or policy management modules. Primarily, it is a further safeguard against unauthorized or rogue mobile devices trying to hijack the security policies or corporate data of the endpoint device. In this regard, various authorization protocols and techniques may be used. One example is a simple username and password verification scheme. Another example is a cryptographic authentication protocol. The authorization module 232 may also be used to authorize a communication exchange between the client system 201 and the remote diagnostics module 224.

In the remote diagnostics module 224, concern is concentrated on the security or protection of data accessible by mobile client devices. However, the remote diagnostics module 224 may also function to provide diagnostic support for computer problems generally encountered by mobile client devices independently of security related software. In this embodiment, the remote diagnostics module 224 provides diagnostic assistance and/or corrective instructions with respect to problems not only associated with security but also provides such support with other problems generally encountered by mobile client devices. To accomplish this, the remote diagnostics module 224 has a communication interface with each of the user interface module 240, the authorization module 232, the policy management module 236 and the policy distribution module 234. Ultimately, this allows a person using the mobile device to get the device repaired where they are as opposed to having to mail the device or wait until he or she is back in the office ("work" location 106) to get help.

With reference to FIG. 2B, the client 201 includes a location detection module 208, a policy setting module 212, security features determination module 210 (including security agent and relationship to a timer 211, described below), a policy enforcement control module 214, a layer manager 206, a user interface module 218, particular memory location(s) 216 in an otherwise attendant memory 220 (ROM, RAM, etc.), an authorization module 245, a client diagnostics module 246, and access to remote or local storage 247, e.g., disk.

In more detail, the authorization module 245 is configured to provide authorization information to the authorization module 232 of the server system 200 to establish communication exchanges with the client mobile device for the exchange of security information or diagnostic information or both. The client diagnostics module 246, on the other hand, collects diagnostic information which is sent to the remote diagnostics module 224 of the server system embodiment 200.

In the layer manager 206, a communications interface is established to one or more of the other modules 208, 210, 212, 214, 245, 246. In function, the layer manager processes network traffic which may include inbound data (e.g. from other computing devices) accessible over a network and outbound copies of data objects from resident memory 220. In this embodiment, the layer manager 206 processes information in one or more layers of a model for communications between computers in a network. An example of such a model is the Open Systems Interconnection (OSI) data communications model. As is known, the OSI includes seven layers arranged as: the physical layer, the data-link layer, the network layer, the transport layer, the session layer, the presentation layer, and the application layer. Of course, another example of a model is the layered Internet Protocol stack. In this regard, skilled artisans understand four layers to be arranged as the subnetwork layer, the Internet layer, the transport layer, and the application layer.

In either, if the layer manager 206 forwards network parameters to the location detection module 208, the location detection module detects or determines the location (e.g., 102, 104, 106, 108, FIG. 1) associated with the current network environment. As a function of the predetermined computing policy for the endpoint from the server system 200, the policy setting module 212 receives, installs and updates security or other information, based on the location. Such may be found as indicators in memory locations 216 read by the policy setting module 212. Alternatively, they may include security policies and/or software updates received from the policy management module 236 via the policy distribution module 234 over the network connection 204. In addition, the policy setting module 212 may define criteria or, if permissions set by the policy management module 236 allow, supplemental policy definitions or customization of policy definitions based upon user input processed by the mobile device user interface module 218. Similarly, if operating in a standalone mode not under the control of the server system, the policy setting module 212 defines an aspect of a policy such as location criteria or security features criteria based upon user input processed by user interface module 218. The policy setting module 212 may also undertake these events periodically, randomly, and/or responsive to a notification message from another module, such as the location detection module 208.

In an alternate embodiment, an optional policy setting module 238 may operate on a server computer system such as the one illustrated in FIG. 2A that determines the selection of the current security policy for the mobile device based on criteria information received from the mobile device including location and activity status of one or more security features or based on network parameters forwarded by the layer manager 206. In this embodiment, a module on the client device such as the policy enforcement control module 214 receives commands from the policy setting module 238 and executes them on the mobile device.

Alternatively still, a user can direct the policy by way of a user interface module 218. As is typical, the user interface module 218 receives input from a user input device such as a keyboard, mouse or touch pad.

In other aspects, a security feature module 210 determines whether one or more security features have an activity status of inactive or active in a communication session between the mobile device and another computer. An example of this is determining whether a connection type to the other computer is wired or wireless. Simply enough, this can be indicated by associating the port over which data is being communicated, e.g., a wireless adapter, a network interface card (NIC), a modem, etc. In another example, further details of the connection may be indicated by subdivision into further distinctions (e.g. wireless: 802.11, GPRS, GSM, 3G, etc., or wired: modem, digital subscriber line (DSL), T1 line, etc). In other embodiments, policies may be set based on these items. For example, a different security policy may be applied for different vendor brands of NICs or particular classes (e.g. 802.3, 802.11a, 802.11b, GPRS, GSM) of NICs. Furthermore, different security policies may be assigned based on a type of operating system (Unix, Linux, Windows, Leopard, etc.) employed or the version (e.g., 3.1, 3.2, 3.3) of the operating system because different systems or versions provide different security features. Furthermore, different policies may be employed based on the security features (e.g. a firewall) provided by different types of network access points (NAP). Additionally, the presence or absence of upgraded NIC support for enhanced security protocols (e.g. 802.11i), or the presence or absence of security software such as virtual private network (VPN), or anti-virus software, or intrusion-detection software may be the basis for setting different policies on a particular port, network adapter or data.

Figure 3:
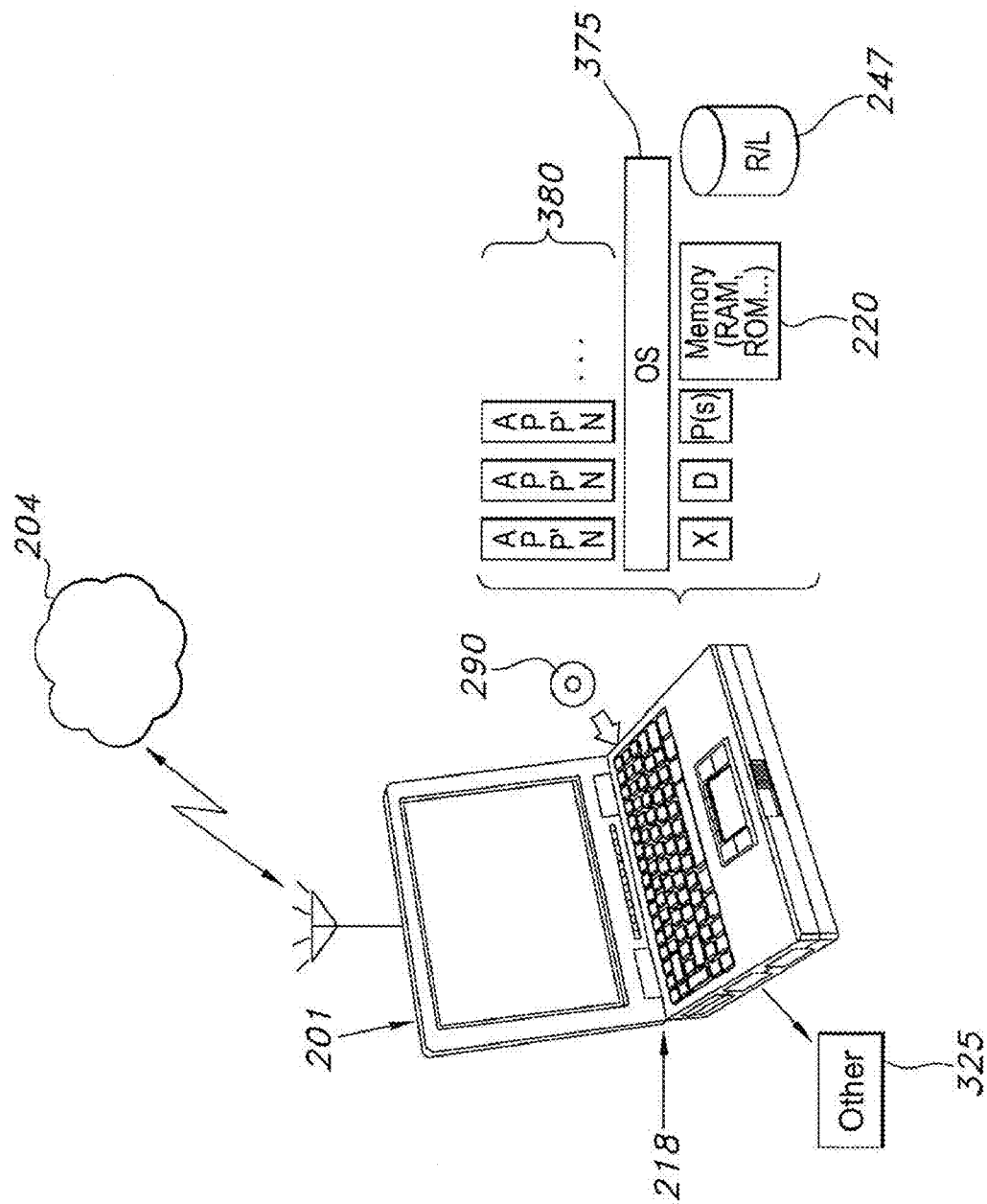
FIG. 3 is a diagrammatic view in accordance with the present invention of a representative endpoint asset in the form of a laptop computing device.

Leveraging the foregoing, FIG. 3 begins the detailed illustration of the mechanics for actually enforcing internet connections by way of the endpoint computing asset (e.g., 201). Preliminarily, however, further tangible items exist on the computing asset 201, in addition to the modules described in FIG. 2B, such as a hardware platform upon which the firmware, operating system (OS) 375 and computing applications (APP'N) 380 are found. As is typical, the hardware platform embodies physical I/O and platform devices, memory 240 (RAM, ROM, etc.), one or more processor(s) (P), such as a CPU, drivers (D) and interfaces (X) to internal or other items 325, and access to remote or local storage (R/L) 247. In a virtual embodiment, a plurality of domains exist each with an operating system and applications. Also, a hypervisor layer serves to schedule control between the various domains relative to the hardware platform. In either, the policy control module can exist as part of the operating system or work in conjunction with it.

Figure 4A:
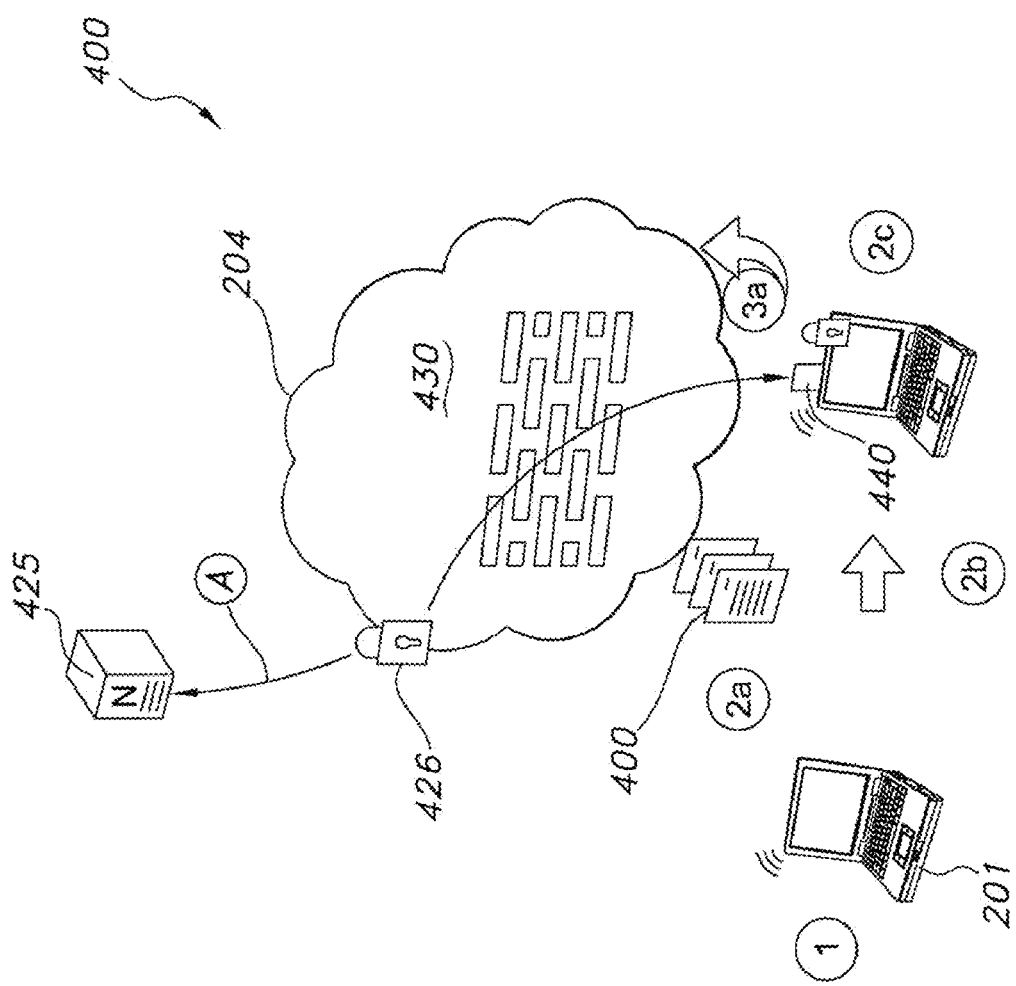
FIGS. 4A and 4B are related diagram and flow chart views in accordance with the present invention for enforcing a secure internet connection on an endpoint computing device.
Figure 4B:
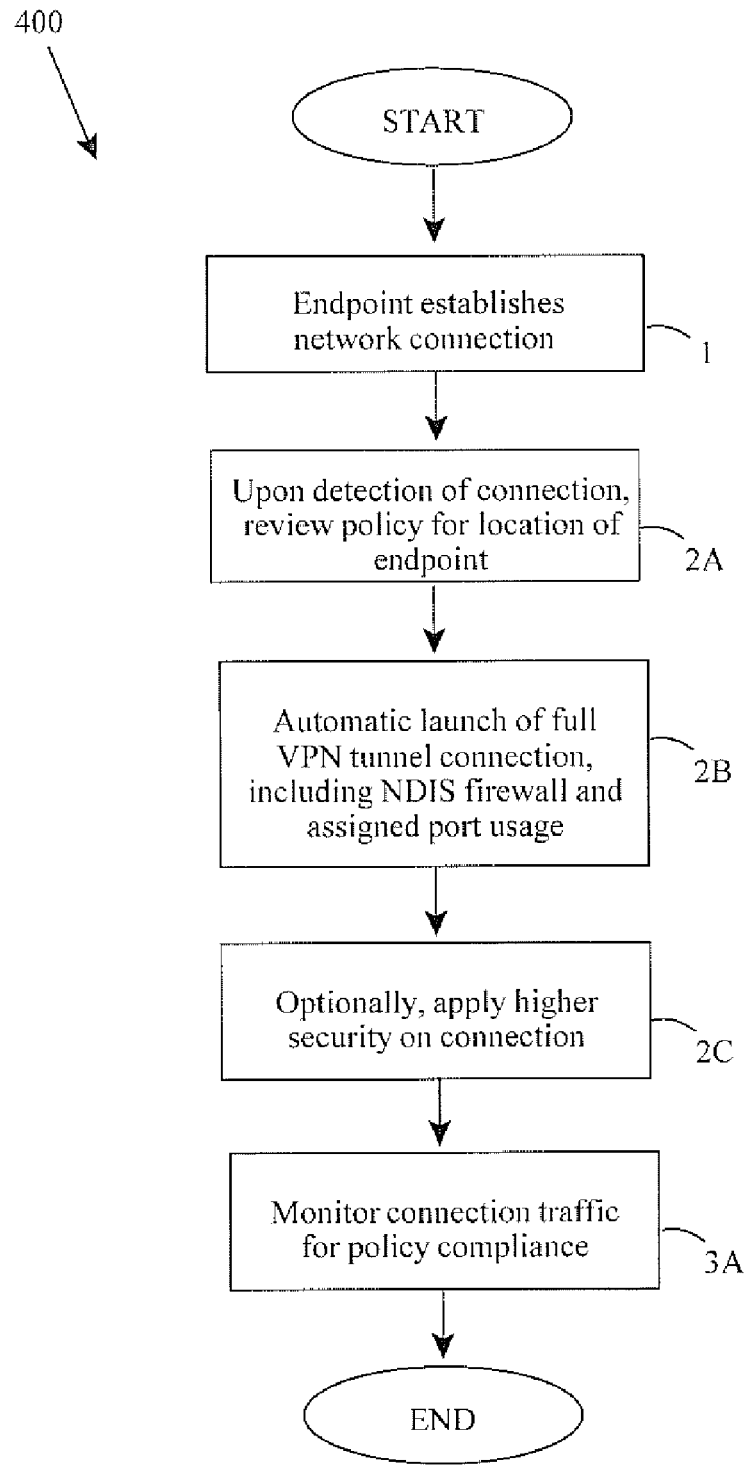

With reference to FIGS. 4A and 4B, a representative method of enforcing an internet connection from an endpoint 201 occurs generally as 400. At step 1, the endpoint 201 establishes a network connection. (A preliminary step may also exist that first determines whether an internet connection is even available to the endpoint.) It may occur as a wired or wireless connection and may exist at a mobile location category, such as a "hotspot," hotel, etc. In this regard, a user may need to enter credentials for authentication and provide them to an Internet Service Provider, such as a name and password, in order to first gain access to the internet. Such is also very common at hotspots, hotels, etc.

At step 2A, the security agent (e.g., 210, FIG. 213) detects the existence of the internet connection having been made, and then reviews the security policy 400 related to this action. Detection may occur in a variety of ways, but simply may be achieved by inspecting packets sent from the endpoint and by observing activities such as usage of a modem, a network interface card, etc. Also, the policy review occurs relative to the location of the endpoint. For instance, the endpoint knows its network location, e.g., home 104, mobile 102, alternate 108, FIG. 1, based upon the functionality occurring in its location detection module 208, FIG. 2B. Then, the policy for this location is obtained and analyzed to determine the appropriate actions for internet connections. If at the location "work," for example, the policy may require no special security because the endpoint exists behind the corporate firewall. On the other hand, if the endpoint is at a location other than work, such as "mobile," the policy may be set as follows.

At step 2B, the endpoint automatically launches a full VPN tunnel connection (indicated by action arrow A and a lock icon 426) between the endpoint computing device and another computing device 425. This also includes an NDIS firewall 430 forcing packet traffic of the internet connection through a port 440 of the endpoint computing device specially assigned by the security policy 400. Among other things, the port can be a particular NIC in the endpoint. Alternatively, the NDIS firewall can apply restrictions such that the packet traffic occurs via particular MAC/IP addresses of a VPN concentrator. In either embodiment, optional features include further security on the connection, such as application of 802.11x with the highest levels of EAP, 802.11 WEP/WPA/WPA2, 802.1 encryption, etc., step 2C.

At step 3A, now that all the packet traffic has been funneled through a particular port of the endpoint, for example, it can be easily monitored for compliance with the security policy. As will be seen, a variety of ways can be used for the monitoring and it occurs to ensure that all network traffic is forced through a full tunnel VPN connection (thereby complying with policy for the location of the endpoint). In certain embodiments, packet traffic may not occur within a given time, thereby indicating the lack of internet usage and the VPN tunnel connection can be taken down. Alternatively, the packet traffic can be observed as being attempted over ports other than the assigned ports, thereby indicating attempted circumvention of the policy. Additionally, the policy could specify that the user has a certain amount of initial time to establish a VPN connection before regular monitoring events occur. This might exist in scenarios when a user in a hotel must first log into a portal of the hotel before an internet connection is even allowed to take place, especially in instances when charges accrue for internet usage.

In any situation, the monitoring can be done in a number of ways. For example, the NDIS driver could monitor network traffic to verify inbound data/packets from the VPN concentrator and use that as a means of identifying the connection was correctly established. URLs or other links (IP addresses, etc.) could also be provided that are only accessible if the endpoint is tunneled into the corporate infrastructure. This would be definable by security policy. Other embodiments could also interact with third party tools, applications, and such to see if information exchange is possible (and again only possible) through the VPN connection. In other words, the act of monitoring need not occur while knowing any of the VPN protocols, which are often specified by proprietary schemes of third parties who provide the protocol. Namely, a port can be monitored for packet traffic with or without knowing the VPN protocol. To the extent the protocol is known, monitoring is made easy and the content is understood. Conversely, if the protocol is unknown, packet traffic can still be monitored for movement through the port, but without knowing the content. By analogy, a human can listen to other people speaking a foreign language without they themselves knowing the words of the language or understanding what is being said. The listener knows simply by listening, however, that others are communicating but not its content.

On the other hand, if the VPN connection cannot be confirmed, the endpoint can be placed in a quarantined state. This could mean completely restricting the firewall to prevent all network traffic from arriving or leaving the endpoint, disabling all types of network adapters in the endpoint, or by other means. Additionally, a message could be presented to the end user indicating why they were quarantined and what steps require undertaking to overcome the problem (e.g., remediation). Optionally, the redecication steps could occur automatically. Examples of remediation include, but are not limited to, downloading and installing or upgrading the VPN client, installing/upgrading certificates (or other security token methods) for authentication and data encryption, as well as providing other authentication mechanisms (prompting for credentials, checking current user/device credentials, authenticating to various directory services, etc.).

Figure 5:
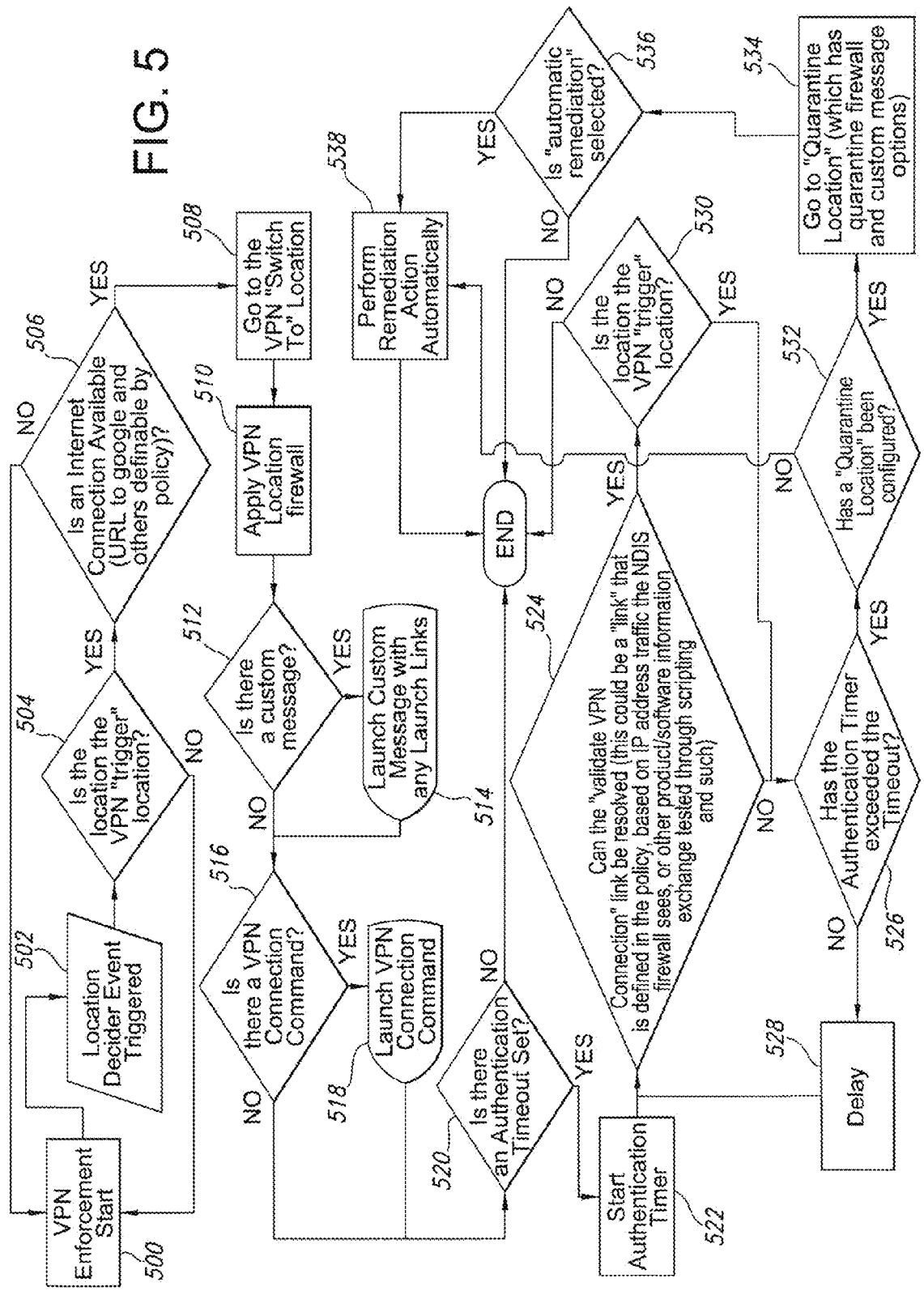
FIG. 5 is a flow chart in accordance with the present invention of representative functionality to enforce the secure connection according to the policies of the endpoint computing device.

With reference to FIG. 5, a more detailed flow for undertaking secure enforcement of an internet connection for an endpoint begins with step 500. At step 502, an event is triggered that decides the location of the endpoint, such as work, home, mobile, etc. At 504, it is determined whether the location is one where policy requires an internet connection to be undertaken with a full VPN tunnel connection. As before, a "work" location would not trigger the VPN tunnel since the endpoint is behind a corporate firewall, whereas a mobile hotspot, which is generally insecure, would trigger the VPN tunnel. For the former, the process returns to start, step 500, until such time as a location of the endpoint requires a VPN tunnel.

On the other hand, the latter triggers a next event, step 506, that examines whether an internet connection is even currently available to the endpoint. For this, it is common for an endpoint to search for wireless networks within range and provide a list to the user. Alternatively, an ethernet cable plugged into the endpoint in a hotel room, for example, serves another means for identifying the availability of an internet connection especially upon a user initiating a connection by "clicking" on a browser icon. Naturally, this event may further require intelligence to deal with internet proxy setups and/or other setups that appear as user-defined internet access. To the extent no internet connection is available to the endpoint, the process again returns to start, step 500, until such time as one becomes available. Conversely, if a connection is currently available, steps 508 and 510 undertake the acts of a software architectural flow of "Go to the VPN 'Switch to' Location" and locking-down the endpoint by applying the restrictions of the firewall (NDIS) for that location. In more detail, this means selecting the port of the endpoint by which the endpoint will communicate, and preventing or disabling the others from communication. At steps 512 and 514, if messages are available for "throwing to" the users to inform them of what is taking place with the endpoint's security, they are indeed "thrown" or launched, including any relevant linking.

At steps 516 and 518, if the VPN can be launched automatically without user intervention, it is so done. The internet connection is confirmed by initiating HTTP requests to predetermine website URLs. The header for the response from this request contains a sign name for the website which is validated against the initial request. This may also include the optional integration of particular brands of VPN protocol provided by third party vendors, such as Cisco, so that the packet traffic of the internet connection can not only be monitored, but understood. Again, "monitoring" can occur with or without know the protocol of the VPN tunnel.

At step 520, it is appreciated that scenarios exist whereby users in hotels, for example, must first log into a portal of the hotel before an internet connection is even allowed to take place, especially in instances when charges accrue for internet usage. For this, an optional period of time is established, such as a few minutes, to allow the user to get his connection up and running before monitoring of the packet traffic occurs. This step also appreciates that monitoring of the internet connection and VPN tunnel may be different for an initial set up versus ongoing monitoring well after users have established their connection.

At step 522, an authentication timer is started that eventually defines the window for monitoring packet traffic, e.g., timer 211, FIG. 2B. It can be a timer started from zero that counts forward, a defined amount of time that counts downward until timed out, or other. It can be as short as a few seconds, to as long as a few minutes or more. In either situation, step 524 undertakes the role of confirming the proper operation of the VPN tunnel connection as a function of the authentication timer. As before, confirmation can occur in a variety of ways, such as a link defined by the policy, an IP address in packet traffic that the NDIS firewall sees, or other. Then, if confirmation of proper operation cannot occur at step 524, step 526 investigates whether the timer (started at step 522) has timed out. If not, validation or confirmation of proper VPN tunnel operation occurs again at step 524 (after some predefined period of delay 528, e.g., seconds, minutes, etc.), and loops around, until eventually the timer times out. In other words, validation may be examined many times over before it is concluded that the VPN tunnel connection is not being used, or being used improperly, whether policy is not in compliance, etc.

On the other hand, validation of proper operation of the VPN tunnel may occur at step 524 on a first examination pass or on a later pass after looping through steps 526 and 528. In either situation, validation then begets the inquiry of whether ongoing monitoring of the VPN connection is required, step 530. If so, examination of the authentication timer is again undertaken at step 526 and the process repeats. Otherwise, the process ends since the VPN tunnel connection is no longer important to monitor, such as when a user closes out their internet connection.

At step 532, it is appreciated that VPN tunnel connections may not be operating properly, may be circumvented, may have insufficient packet traffic over a given time, etc., which then forces quarantining of the endpoint (which presumes the security policy being non-compliant). In this regard, all packet traffic may be stopped from arriving/leaving the endpoint, or only certain packet traffic may be enabled so that a user can patch its VPN software, for example, or in other ways. Thus, a quarantine location is established for the endpoint and the user is made aware of the failed policy by way of custom message options, step 534. This may also include a variety of logging or other analysis events in order to debug the problem in the future.

Lastly, at steps 536 and 538, remediation or fixing of the failed policy is attempted so that the users can again make internet connections from their endpoint when they are at locations requiring a VPN tunnel. The remediation can be automatically initiated, such as by way of an administrative function that selects automatic remediation, step 536, which then performs it without user intervention, step 538. Certain remediation includes restarting the foregoing with entry of a network adapter disable/re-enable, with a manual change of the "location" of the endpoint, or by other means. Of course, remediation can be undertaken manually by users.

Ultimately, skilled artisans should now recognize that security policies can be enforced in a network environment not traditionally known for security. Also, it is now the situation that corporate paper policies have actual forms of implementation that can be authenticated and documented. Also, skilled artisans will appreciate that enterprises can implement some or all of the foregoing with humans, such as system administrators, computing devices, executable code, or combinations thereof. In turn, methods and apparatus of the invention further contemplate computer executable instructions, e.g., code or software, as part of computer program products on readable media, e.g., disks 290 (FIG. 3) for insertion in a drive of computing device, or available as downloads or direct use from processor firmware, memory or storage of an upstream computing device. When described in the context of such computer program products, it is denoted that executable instructions thereof, such as those in components, modules, routines, programs, objects, data structures, etc., perform particular tasks or implement particular abstract data types within various structures of the computing system which cause a certain function or group of function, and enable the configuration of the foregoing.

The foregoing has been described in terms of specific embodiments. However, one of ordinary skill in the art will recognize that additional embodiments are possible without departing from the teachings of the present invention. This detailed description, therefore, and particularly the specific details of the exemplary embodiments disclosed, is given primarily for clarity of understanding, and no unnecessary limitations are to be implied, for modifications will become evident to those skilled in the art upon reading this disclosure and may be made without departing from the spirit or scope of the invention. Relatively apparent modifications, of course, include combining the various features of one or more figures with the features of one or more of other figures.

The invention claimed is:

1. In a computing system environment, a method of enforcing a secure internet connection by way of a mobile, endpoint computing device, comprising:
    pre-defining a security policy for the endpoint computing device based on a location of the endpoint computing device;
    at that location, establishing an internet connection from the endpoint computing device to another computing device;
    by the endpoint computing device, automatically launching a VPN tunnel connection between the endpoint computing device and the another computing device including forcing packet traffic of the internet connection through the VPN tunnel connection and a port of the endpoint computing device assigned by the security policy; and
    at the endpoint computing device, monitoring the packet traffic to ensure that all said packet traffic of the internet connection is forced through the VPN tunnel connection in compliance with the security policy and determining whether said packet traffic is attempted over ports of the endpoint computing device other than the assigned port.

2. The method of claim 1, wherein the monitoring further includes determining whether any said packet traffic over the assigned port has occurred within a given time.

3. The method of claim 1, further including quarantining the endpoint computing device if the VPN tunnel connection cannot be confirmed.

4. The method of claim 1, wherein the monitoring further includes monitoring without knowing a protocol of the VPN tunnel connection.

5. The method of claim 1, wherein the monitoring further includes verifying inbound packet traffic from a VPN concentrator to determine proper VPN connection establishment.

6. The method of claim 1, including performing remediation if the security policy is not satisfied.

7. In a computing system environment, a method of enforcing a secure internet connection by way of a mobile, endpoint computing device, comprising:
    pre-defining a security policy for the endpoint computing device based on a location of the endpoint computing device;
    at that location, establishing an internet connection from the endpoint computing device to another computing device;
    by the endpoint computing device, automatically launching a full VPN tunnel connection between the endpoint computing device and the another computing device, including an NDIS firewall forcing packet traffic of the internet connection through the full VPN tunnel connection and a port of the endpoint computing device assigned by the security policy; and at the endpoint computing device, monitoring the packet traffic at the assigned port to ensure that all said packet traffic of the internet connection is forced through the VPN tunnel connection in compliance with the security policy and determining whether said packet traffic is attempted over ports of the endpoint computing device other than the assigned port.

8. The method of claim 7, wherein the monitoring further includes monitoring without knowing a protocol of the VPN tunnel connection as prescribed by a third party vendor.

9. The method of claim 7, further including determining whether the endpoint computing device has access to the internet.

10. The method of claim 7, further including quarantining the endpoint computing device for non-compliance of the security policy.

11. The method of claim 10, wherein the quarantining further includes preventing all said packet traffic to the endpoint computing device.

12. The method of claim 10, wherein the quarantining further includes disabling network adapters of the endpoint computing device.

13. In a computing system environment, a method of enforcing a secure internet connection by way of a mobile, endpoint computing device, comprising:
pre-defining a security policy for the endpoint computing device based on a location of the endpoint computing device;
at that location, establishing an internet connection from the endpoint computing device to another computing device;
by the endpoint computing device, launching a VPN tunnel connection between the endpoint computing device and the another computing device including forcing packet traffic of the internet connection through the VPN tunnel connection by way of a MAC/IP address of a VPN connector assigned by the security policy; and
at the endpoint computing device, monitoring the packet traffic to ensure that all said packet traffic of the internet connection is forced through the VPN tunnel connection in compliance with the security policy and determining whether said packet traffic is attempted over ports of the endpoint computing device other than the assigned port.

14. In a computing system environment, a method of enforcing a secure internet connection by way of a mobile, endpoint computing device, comprising:
pre-defining a security policy for the endpoint computing device based on a location of the endpoint computing device;
at that location, establishing an internet connection from the endpoint computing device to another computing device;
detecting the established internet connection;
based on the detecting, by the endpoint computing device, automatically launching a full VPN tunnel connection between the endpoint computing device and the another computing device, including forcing packet traffic of the internet connection through the full VPN tunnel connection, an NDIS firewall, and a port of the endpoint computing device assigned by the security policy; and
at the endpoint computing device, monitoring the assigned port for said packet traffic within a given time to ensure that all said packet traffic of the internet connection is forced through the VPN tunnel connection in compliance with the security policy and determining whether said packet traffic is attempted over ports of the endpoint computing device other than the assigned port.

15. A network computing system, comprising:
a first computing device able to establish an internet connection with a second computing device, the first computing device having at least one port for conducting the internet connection and,
a security module to enforce a pre-defined security policy,
a location detection module to determine a location thereof,
a VPN module to automatically launch a full VPN tunnel connection between the first and second computing devices upon detecting said internet connection having been made,
an NDIS firewall to force packet traffic of the internet connection through the full VPN tunnel connection and one of the ports assigned by the security policy through the security module, and
a security agent to monitor the packet traffic at the assigned one port to ensure that all said packet traffic of the internet connection is forced through the full VPN tunnel connection in compliance with the security policy and to determine whether said packet traffic is attempted over ports of the endpoint computing device other than the assigned port.

16. The network computing system of claim 15, wherein the first computing device further includes a timer that the security agent utilizes to determine whether any said packet traffic over the assigned one port has occurred within a given time.

17. The network computing system of claim 15, wherein the security agent is configured to quarantine the first computing device if the VPN tunnel connection cannot be confirmed.

18. A non-transitory computer program product for loading on a computing device to enforce a secure internet connection of a mobile, endpoint computing device, the computer program product having executable instructions that detect an internet connection with the endpoint computing device and another computing device and based on the detected internet connection automatically launches a full VPN tunnel connection between the endpoint computing device and the another computing device including forcing packet traffic of the internet connection through the full VPN tunnel connection and a port of the endpoint computing device assigned by a pre-determined security policy whereby said packet traffic can be monitored to ensure that all said packet traffic of the internet connection is forced through the VPN tunnel connection in compliance with the security policy;
the computer program product further including executable instructions that determine whether said packet traffic is attempted over ports of the endpoint computing device other than the assigned port.

19. The computer program product of claim 18, further including executable instructions that determine whether any said packet traffic over the assigned port has occurred within a given time.

20. The computer program product of claim 18, further including executable instructions that quarantine the endpoint computing device if the operation of the VPN tunnel connection cannot be confirmed.

21. The computer program product of claim 18, further including executable instructions that monitor the packet traffic without knowing a protocol of the VPN tunnel connection.

22. The computer program product of claim 18, further including executable instructions that verify inbound packet traffic from a VPN concentrator to determine proper VPN connection establishment.

23. The computer program product of claim 18, further including executable instructions that perform remediation if the security policy is not in compliance.

* * * * *